D. P. RUGER.
TRANSMISSION MECHANISM.
APPLICATION FILED SEPT. 7, 1909.
968,266.
Patented Aug. 23, 1910.
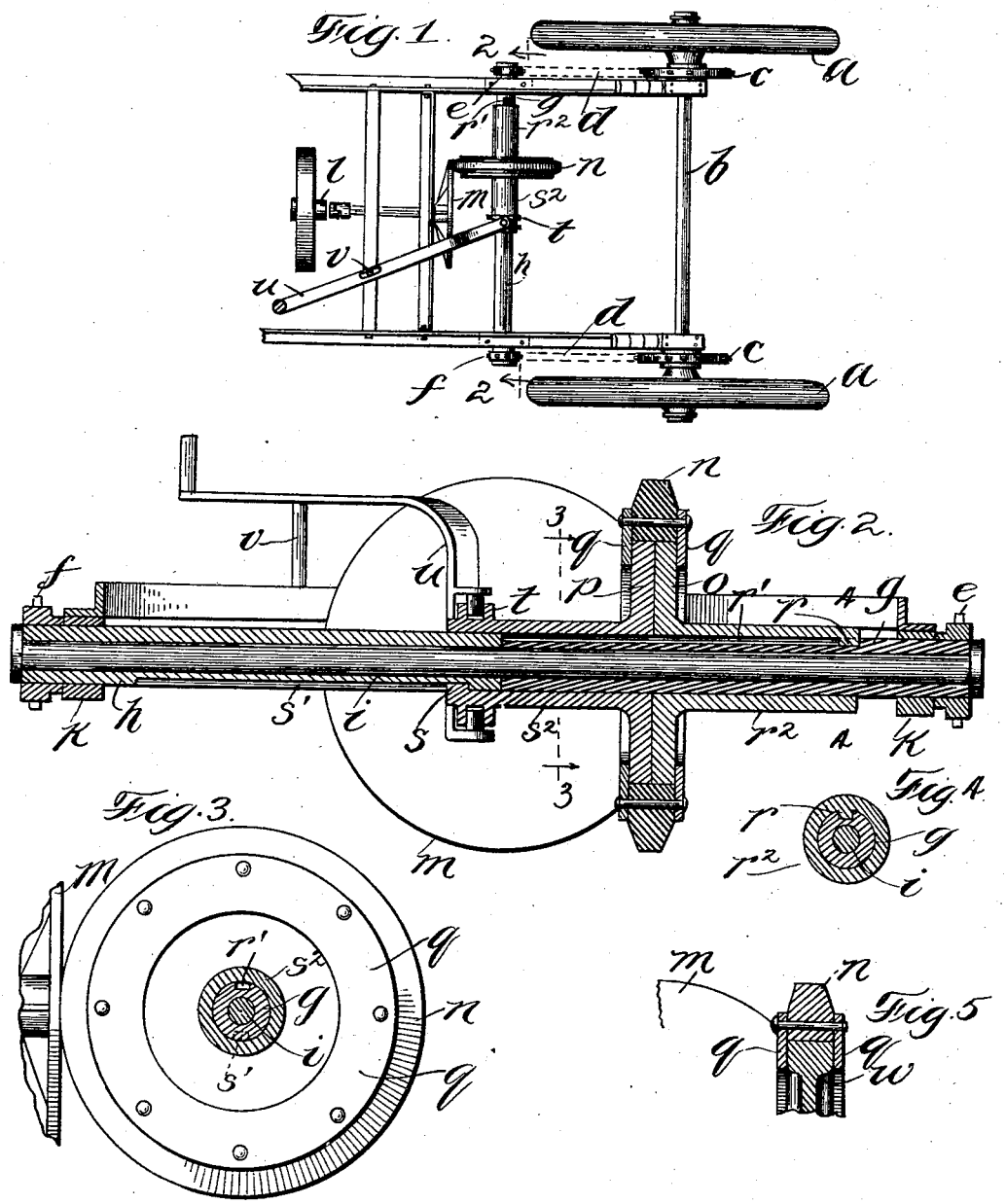

UNITED STATES PATENT OFFICE.

DURL P. RUGER, OF CHICAGO, ILLINOIS.

TRANSMISSION MECHANISM.

968,266. Specification of Letters Patent. Patented Aug. 23, 1910.

Application filed September 7, 1909. Serial No. 516,453.

*To all whom it may concern:*

Be it known that I, DURL P. RUGER, citizen of the United States, residing at Chicago, in the county of Cook and State of Illinois, have invented a certain new and useful Improvement in Transmission Mechanism, of which the following is a full, clear, concise, and exact description, reference being had to the accompanying drawings, forming a part of this specification.

My invention relates to power transmission mechanism, and has for its general object the improvement in the construction of certain gearing portions entering into the mechanism.

The invention, in its preferred embodiment, relates to that class of transmission mechanism in which two gear elements are brought into driving and driven relation by means of frictional engagement that is had therebetween.

In practicing my invention, I desirably employ two frictional gear elements, one in the form of a rotatable disk which is desirably driven by a prime-mover and which presents a frictional surface transverse to its axis, the other frictional gear element including in its formation a peripheral ring which is movable with respect to the part within its circumference, this part desirably having a peripheral surface in frictional engagement with the inner surface of the ring, the outer surface of the ring frictionally engaging said frictional surface of said disk. In the preferred embodiment of my invention, I desirably subdivide the gear element part that is within the circumference of the peripheral ring into two portions, both adapted for driving relation with the aforesaid peripheral ring and adapted to move with respect to each other when encountering unequal torque. The structure as thus preferably made is adapted to the operation of two load-driving devices, one load-driving device being in driving connection with each of the subdivided portions of the part within the circumference of the peripheral ring.

In the preferred embodiment of the invention, I also employ mechanism whereby the gear element including the peripheral ring is moved with respect to the aforesaid frictional surface presented by the rotatable disk, whereby said peripheral ring may be brought toward and from the axis of said disk, to change the ratios of speed of the two gear elements.

Though I have above outlined the preferred embodiment of my invention, I do not wish to be limited to such embodiment.

The embodiment of the invention that has been somewhat specifically described is illustrated in the accompanying drawing, which I will now describe.

In the drawing—Figure 1 shows the adaptation of my power transmission mechanism to the gearing of an automobile. Fig. 2 is a sectional elevation on line 2 2 of Fig. 1. Fig. 3 is a sectional end view on line 3 3 of Fig. 2. Fig. 4 is a sectional end view taken through the outer end of a sleeve constituting the lateral continuation of one of the gear elements. Fig. 5 illustrates a modification of the structure of my invention.

Like parts are indicated by similar characters of reference throughout the different figures.

I will describe my invention as it is associated with the gearing of an automobile, though I do not wish to be limited to the use of the invention in connection with automobiles.

In Fig. 1 is shown the driving-traction-wheels *a a* of an automobile, that are mounted upon a common shaft *b*, upon which they may rotate with respect to each other. A sprocket-wheel *c* is in fixed relation with each wheel *a*. A sprocket-chain *d* passes about each sprocket-wheel *c* and also about sprocket-wheels *e* and *f*, which latter sprocket-wheels are driven by means of the transmission mechanism of my invention. Sprocket-wheel *e* is fixed with respect to a quill-shaft *g* and sprocket-wheel *f* is fixed with respect to another quill-shaft *h*, these quill-shafts being rotatable with respect to each other and with respect to a supporting shaft *i* passing through the same. Suitable bearings *k* surround the quill-shafts and serve to support the same.

The power is furnished by some suitable form of prime-mover, such as a gasolene engine, diagrammatically indicated at *l* in Fig. 1, the engine driving a rotatable disk *m*, constituting one of the frictional gear elements, this disk presenting a frictional surface transverse to its axis, which frictional surface is engageable by a peripheral ring *n* forming part of a complemental frictional gear element. The peripheral ring *n* surrounds two disks *o* and *p*, which, together with the ring *n*, form a part of the same frictional gear element. The peripheral surfaces of the portions *o* and *p* have frictional engagement with the inner surface of the ring *n*, this frictional engagement being of sufficient strength to permit of the transmission of power between the friction gear *m* and the elements *o* and *p* of the companion friction gear, the strength of this frictional engagement, however, not being sufficient to prevent slippage between the parts *o* and *p* and the circumscribing ring *n* under circumstances which will appear. The ring *n* is maintained in the plane of the parts *o* and *p* by means of face-rings *q*, that are shown bolted to the ring *n* and which project inwardly to cover the outer portions of the parts *o* and *p*. I do not rely upon the friction between the rings *q* and the parts *o* and *p* to couple these parts *o* and *p* with the ring *n* in driving relation, but rather rely upon the frictional engagement between the inner surface of the ring *n* and the peripheral surfaces of the parts *o* and *p*. The part *o* is brought into driving relation with the quill-shaft *g* by means of a key *r* that enters a key-way $r^1$ in said quill-shaft; the portion *p* is brought into driving relation with the quill-shaft *h* by means of a key *s* that enters a key-way $s^1$ in the quill-shaft *h*. The keys *r* and *s* are desirably formed in the outer ends of sleeves $r^2$ $s^2$, that constitute lateral continuations of the parts *o* and *p*, respectively, said keys projecting radially inwardly to enter their respective key-ways, which key-ways are extended longitudinally of the quill-shafts to permit the gear element including the parts *n o* and *p* to move longitudinally of the shaft *i* and across the face of the friction disk or gear element *n*. In order that the longitudinal movement spoken of may be accomplished, I provide a collar *t* upon the sleeve $s^2$, this collar being peripherally grooved and receiving the ends of a forked lever *u* pivoted at *v* and adapted, when swung, to shift the gear element *n o p*.

The friction disk *m* may, if desired, rotate at a substantially uniform speed, and the speed to be imparted to the load may be varied by shifting the lever *u*, thereby to bring the ring *n* nearer to or farther from the axis of the disk *m*, the speed being *nil* with the ring *n* opposite the center of the disk *m* and being greatest when in the outermost position illustrated in Fig. 1. The load is driven in one direction when the ring *n* is upon one side of the center of the disk *m* and in the reverse direction when said ring is upon the other side of said center.

In the case of automobiles, the transmission elements *d d* generally travel at the same speed and impart the same torque to the driving-wheels *a a* when the automobile is moving in a substantially straight line. In rounding curves, it is apparent that the chains *d d* should not travel at the same speed, and they are permitted to travel at different speeds by forming the gear element part surrounded by the ring *n* into two parts *o* and *p*, as indicated, these two parts being adapted for relative movement about their common axis when the chains *d* are to operate at different speeds. I do not wish to be limited in all embodiments of my invention to a structure in which two parts *o* and *p* are employed, as the ring *n* may surround an undivided portion *w* as indicated in Fig. 5, which portion *w* is designed to have fixed engagement with the casing of a differential gear, as illustrated, for example, in Patent No. 761,146, dated May 31, 1904, and issued to B. J. Carter.

When my invention is adapted to the form of transmission illustrated in the drawing, it is very apparent that advantages are secured, as compared with friction gearing mechanism of the general type illustrated and known in the prior art.

It is apparent that with the apparatus of my invention, the peripheral surface of the ring *n* that engages the disk *m*, need not wear flat, since the frictional engagement between the ring *n* and the parts *o* and *p* is of such a degree that relative movement will occur between the ring *n* and the parts *o* and *p* before the turning movement of the ring *n* will cease. In other words, the ring *n* will continue to rotate, though either or both of the parts *o* and *p* may have their rotation checked or stopped. In the preferred embodiment of the invention, there is a limited movement of the ring *n* in the plane of and with respect to the parts *o* and *p*, the disk *m* forcing the desired frictional engagement between the ring *n* and the parts *o* and *p*.

While I have herein shown and particularly described the preferred embodiment of my invention, it is obvious that changes may readily be made therein, without departing from the spirit of the invention, and I do not, therefore, wish to be limited to the precise construction shown, but,

Having thus described my invention, I claim as new and desire to secure by Letters Patent:—

1. Power transmission mechanism including two frictional gear elements, one in the form of a rotatable disk presenting a frictional surface transverse to its axis and the other including in its formation a peripheral ring which is movable with respect to the part it incloses, said part having a peripheral surface in frictional engagement with the inner surface of the ring, the outer surface of the ring frictionally engaging said frictional surface of said disk, the gear element part within the peripheral ring being subdivided into two portions, both adapted for driving relation with the aforesaid peripheral ring and adapted to move with respect to each other when encountering unequal torque, load-driving mechanism in connection with each of the subdivided portions of the part within the peripheral ring, and mechanism whereby the gear element including the peripheral ring is moved with respect to the aforesaid frictional surface presented by the rotatable disk transverse to the axis of said disk.

2. Power transmission mechanism including two frictional gear elements, one in the form of a rotatable disk presenting a frictional surface transverse to its axis and the other including in its formation a peripheral portion which is movable with respect to the part it incloses and which has driving frictional engagement with such part, said peripheral portion frictionally engaging said frictional surface of said disk, the gear element part within the peripheral portion being subdivided into two portions, both adapted for driving relation with the aforesaid peripheral portion and adapted to move with respect to each other when encountering unequal torque, load-driving mechanism in connection with each of the subdivided portions of the part within the peripheral portion, and mechanism whereby the gear element including the peripheral portion is moved with respect to the aforesaid frictional surface presented by the rotatable disk transverse to the axis of the disk.

3. Power transmission mechanism including two frictional gear elements, one in the form of a rotatable disk presenting a frictional surface transverse to its axis and the other including in its formation a peripheral portion which is movable with respect to the part it incloses and which peripheral portion frictionally engages said frictional surface of said disk, the gear element part within the peripheral portion being subdivided into two portions, both adapted for driving relation with the aforesaid peripheral portion and adapted to move with respect to each other when encountering unequal torque, load-driving mechanism in connection with each of the subdivided portions of the part within the peripheral portion, and mechanism whereby the gear element including the peripheral portion is moved with respect to the aforesaid frictional surface presented by the rotatable disk transverse to the axis of the disk.

4. Power transmission mechanism including two frictional gear elements, one in the form of a rotatable disk presenting a frictional surface transverse to its axis and the other including in its formation a peripheral ring which is movable with respect to the part it incloses, said part having a peripheral surface in frictional engagement with the inner surface of the ring, the outer surface of the ring frictionally engaging said frictional surface of said disk, the gear element part within the peripheral ring being subdivided into two portions, both adapted for driving relation with the aforesaid peripheral ring and adapted to move with respect to each other when encountering unequal torque, and load-driving mechanism in connection with each of the subdivided portions of the part within the peripheral ring.

5. Power transmission mechanism including two frictional gear elements, one in the form of a rotatable disk presenting a frictional surface transverse to its axis and the other including in its formation a peripheral portion which is movable with respect to the part it incloses and which has driving frictional engagement with such part, said peripheral portion frictionally engaging said frictional surface of said disk, the gear element part within the peripheral portion being subdivided into two portions, both adapted for driving relation with the aforesaid peripheral portion and adapted to move with respect to each other when encountering unequal torque, and load-driving mechanism in connection with each of the subdivided portions of the part within the peripheral portion.

6. Power transmission mechanism including two frictional gear elements, one in the form of a rotatable disk presenting a frictional surface transverse to its axis and the other including in its formation a peripheral portion which is movable with respect to the part it incloses and which peripheral portion frictionally engages said frictional surface of said disk, the gear element part within the peripheral portion being subdivided into two portions, both adapted for driving relation with the aforesaid peripheral portion and adapted to move with respect to each other when encountering unequal torque, and load-driving mechanism in connection with each of the subdivided portions of the part within the peripheral portion.

7. A gear element including a peripheral portion and two relatively movable parts frictionally held by said peripheral portion and each adapted to slip with respect to the peripheral portion when subjected to sufficient force.

In witness whereof, I hereunto subscribe my name this second day of July A. D., 1909.

DURL P. RUGER.

Witnesses:
G. L. CRAGG,
L. G. STROH.